United States Patent [19]
Chu

[11] Patent Number: 4,750,046
[45] Date of Patent: Jun. 7, 1988

[54] READ-WRITE APPARATUS

[75] Inventor: Mosi Chu, Setauket, N.Y.

[73] Assignee: Primages, Inc., Ronkonkoma, N.Y.

[21] Appl. No.: 926,905

[22] Filed: Nov. 4, 1986

[51] Int. Cl.$^4$ .............................................. H04N 1/04
[52] U.S. Cl. ..................................... 358/285; 358/286; 358/293
[58] Field of Search ................ 358/256, 286, 293, 285; 355/3 SH, 14 SH

[56] References Cited

U.S. PATENT DOCUMENTS

| | | | |
|---|---|---|---|
| 4,005,257 | 1/1977 | Krallinger et al. | 358/286 |
| 4,424,535 | 1/1984 | Rothbart et al. | 358/293 |
| 4,646,162 | 2/1987 | Sue | 358/293 |

FOREIGN PATENT DOCUMENTS 54-16116  2/1979  Japan ................... 358/286

Primary Examiner—Edward L. Coles, Sr.
Attorney, Agent, or Firm—Roberts, Spiecens & Cohen

[57] ABSTRACT

Reader-writer apparatus includes a common drive roller having a primary axis of rotation lying in a plane which divides a reading region from a writing region and a read follower roller positioned operatively opposite the common drive roller, has an axis of rotation parallel to the primary axis of rotation and is disposed on the read side of the region dividing plane; also, there is a similar write follower roller operatively opposite the common drive roller which has an axis parallel to the primary drive axis and is disposed on the write side of the region dividing plane. A master document feeder is positioned on the read side of the plane to guide a master document between the common drive roller and the read follower to a read site while a master document accepter also on the read side of the region dividing plane accepts a master document passing from the read site. There is also a copy medium feeder on the write side of the plane to guide a copy medium between the common drive roller and the write follower roller to a write site and from the write site to a copy medium accepter also on the write region of the plane. A master document scanner in the read site is positioned to read documents passing through the site and a copy medium recorder on the write region of the plane is disposed in the write site to print on copy medium passing thereby.

20 Claims, 2 Drawing Sheets

READ-WRITE APPARATUS

FIELD OF THE INVENTION

This invention pertains to read-write apparatus and more particularly to device which can either scan or print or print a copy of a simultaneously scanned document.

BACKGROUND OF THE INVENTION

There are presently available machines which will do the scanning such as optical character readers or facsimile devices. There are also devices which will record on paper such as printers or facsimile machines or even xerographic copies. However, generally each one of these machines is separately distinct. Thus, if one wants to perform all of the different processing operations associated with the present day modern office, it is necessary to have a group of these machines. Not only does the group of machines become expensive, but also they take up considerable space.

SUMMARY OF THE INVENTION

It is a general object of the invention to provide a universal office machine which can scan documents or print documents or simultaneously print a document which is being scanned and also make multiple copies of scanned documents.

It is a further object of the invention to provide such apparatus which is not only compact, but also inexpensive with respect to presently available devices.

Briefly, the reader-writer apparatus of the invention contemplates a common drive roller having a primary axis of rotation lying in a plane which divides the reading region from the writing region. A read follower roller means positioned operatively opposite the common drive roller, has an axis of rotation parallel to the primary axis of rotation and is disposed on the read side of the region dividing plane. Also, there is a similar write follower roller means operatively opposite the common drive roller which has an axis parallel to the primary drive axis and is disposed on the write side of the region dividing plane. Master document input means positioned on the read side of the plane are provided to guide a master document between the common drive roller and the read follower means to the read site. A master document accepting means also on the read side of the region dividing plane accepts a master document passing from the read site. There is also a copy medium input means on the write side of the plane to guide a copy medium between the common drive roller and the write follower roller to a write site and from the write site to a copy medium accepting means also on the write side of the region dividing plane. A master document scanning means in the read site is positioned to read documents passing through the site and a copy medium recording means on the write region of the plane is disposed in the write site to print on copy medium passing thereby.

DESCRIPTION OF THE DRAWING

Other objects, the features and advantages of the invention will be apparent from the following detailed description when read in conjunction with the accompanying drawing wherein.

DETAILED DESCRIPTION OF THE PREFERRED EMBODIMENT

Figure 1:
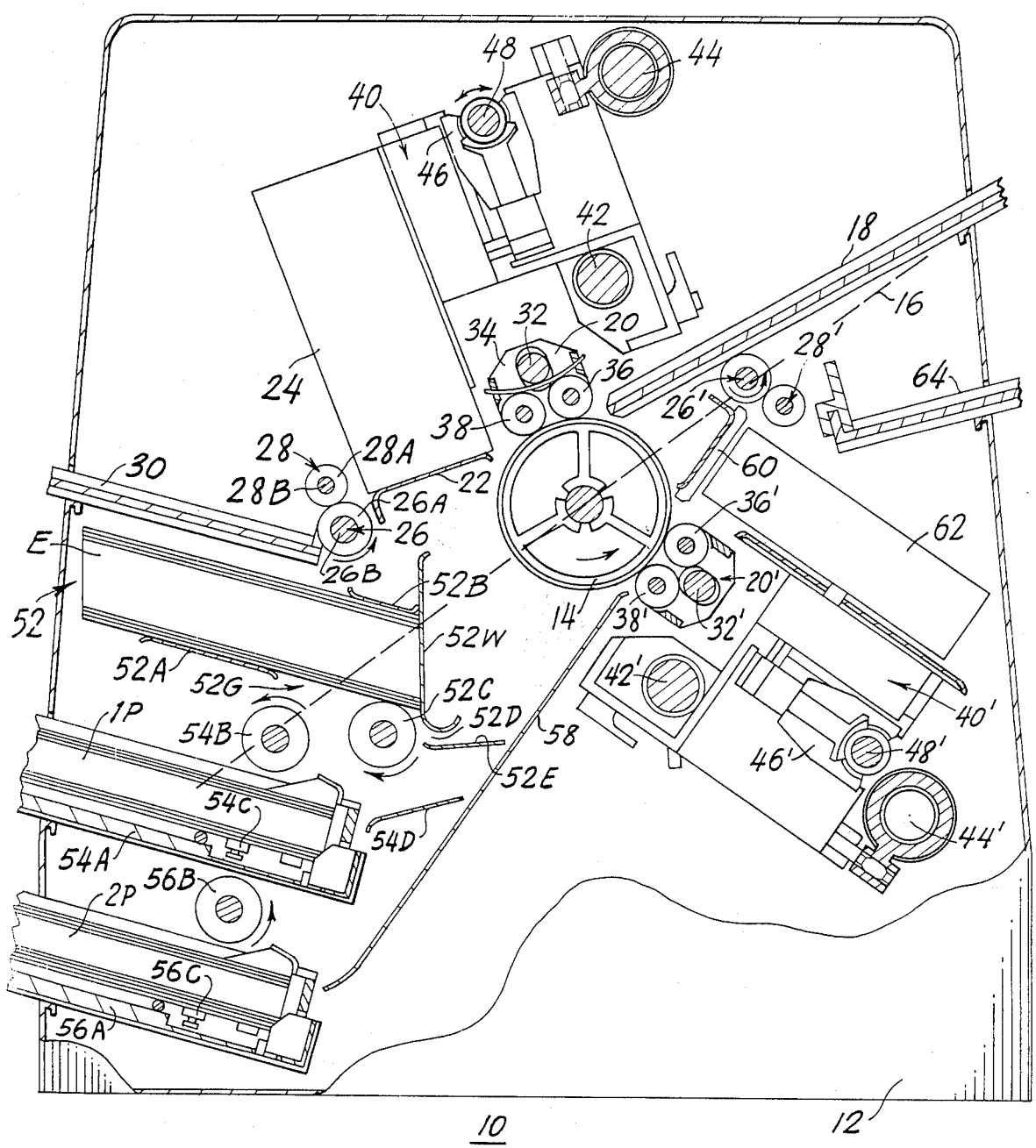
FIG. 1 shows a median cross-section of the apparatus if viewed from its side.

The read-writer 10 shown in FIG. 1 is enclosed within a housing 12. At the near and far sides of the housing there are support frames 12A and 12B which carry the various rollers and other elements. Since the support frames are not necessary for an understanding of the invention, they are shown schematically in FIG. 2. The invention is built on the concept of a common drive roller 14 rotating about a horizontal axis which is included in a region dividing plane 16. In effect, reading or scanning will take place on one side of the region dividing plane whereas printing or writing takes place on the other side of the plane.

The upper side of the plane called the read region is the input of the device for scanning. On the upper side there is provided a master document input means in the form of the guide 18 whose output end is opposite the gap between the common drive roller 14 and a read follower roller means 20. To the left of the roller means 20 there is a read site which is occupied by a scanning bed 22 opposite which is a scanning head 24. Beyond the read site is a tension keeping means in the form of a driven roller 26 and a cooperating free running roller 28. To the left of the tension keeping means as viewed in FIG. 1 there is a master document accepting means in the form of a tray 30. With the drive roller 14 rotating in the direction as shown and the driven roller 26 being driven in the direction as shown (note if a roller has an arrow associated therewith, the roller is driven by a motor or other means not shown) and a master document is in the tray 18, the document will be drawn between the roller 14 and the roller means 20 to the scanning bed 22 so that scanning can be performed by the scanning head 24 with the document then under tension so that the document is flat against the scanning bed.

The above paragraph broadly describes the reading or scanning path and operation. However, some details are worth citing. In particular, in order to provide reliable travel of the medium, the follower means 20 is of unconventional design. It includes a plurality of roller arrays which are disposed horizontally spaced opposite the common drive roller 14. The arrays are disposed along shaft 32. Each shaft includes a yoke 34 which carries two freely rotatable rollers 36 and 38. The rollers are circumferentially displaced from each other along the circumference of the drive roller 14. The driven roller 26 of the tension keeper again is a plurality of rollers 26A on a shaft 26B. The shaft 26B is constantly rotated at a uniform speed. The follower roller again is a plurality of rollers 28A on a shaft 28B.

The document scanning means includes the fixed scanning bed 22 and a scanning head 24 fixed to a carrier 40 which moves in and out of the plane of the drawing as guided by horizontal rails 42 and 44. Fixed to the carrier 40 is a nut arrangement 46 which engages a horizontally disposed lead screw 48. The lead screw 48 is driven by means not shown. Thus as the lead screw rotates, the rotary motion of the lead screw is translated to a linear motion by the nut 46 causing the carrier to move in the horizontal direction. The scanning head 24 can take many forms such as a single photocell but perferably a linear array of such photocells and a light source.

The write portion of the apparatus which is the output device for copying or printing is basically on the lower side of the region dividing plane 16. The write portion also includes a copy medium input means which is preferably three tray means. In particular an envelope tray means 52, a first-sheet tray means 54 and a second-sheet tray means 56. In any event, copy medium from one of the tray means is fed via a guide 58 to the region between the common drive roller 14 and a write follower roller means 20' to a write site that is the region between a platen 60 and a print head 62 which is followed by a tensioning means 28'. Beyond the tensioning means 28' is a stacker tray 64. Thus when a copy medium is driven from a tray means and moved along guide 58, it is pulled through the roller-follower assembly 14-20' and the write site through the tensioning means 28' to the stacker 64.

Since many of the elements are the same as previously described, there will be no need to repeat the description. To indicate similar elements, primed reference numerals are used. Thus, for instance, the tensioning means 28' has the same structure as the tensioning means 28 for the read portion of the apparatus. Similarly the follower roller means 20' is the same as the follower means 20 of the read portion. Furthermore the print head 62 is on a carrier 40', the same as carrier 40 with similar rails 42', 44' and lead screw 48' which is engaged by a similar nut 46'. It should be noted that because of the heavy duplication of critical elements, there is a considerable saving in design and manufacture costs.

On the other hand, the copy medium input means is different from the master document input means. The copy medium input means, as stated above, included three tray means, the first tray means 52 includes a shelf 52A on which rest envelopes E. The front edges of the envelopes rest against front wall 52W. The shaft 52A is displaced from wall 52W to provide feed gap 52G. A weight 52B urges or biases the envelopes toward the drive roller 52C. Thus, when the drive roller 52C is rotated in the direction shown, the bottom envelope in the stack is urged through the opening 52D along guides 52E onto the guide 58. The first paper tray means 54 includes a tray 54A and a driven roller 54B. Paper 1P in the tray 54A is urged upward by a spring 54C against the drive roller 54B. When the drive roller 54B is rotated in the direction shown, the top sheet of paper is fed out onto the guide 54D and from there to the guide 58. The second paper tray means 56 includes a tray 56A and a driven roller 56B. Paper 2P in the tray is urged upward by a spring 56C against the drive roller 56B. When the drive roller is rotated in the direction shown, paper will be moved out onto the guide 58.

The paper leaving the write region pulled through or drawn through by the tensioning means first strikes the bottom of the tray 18 and is deflected into the receiving stacker tray 64.

While the print head can take many forms such as an electromechanical dot matrix printer, it is perferred that the print head be a thermal type printer using a thermal ribbon which includes magnetic particles. In such case, the platen would be of a permanent magnet material PM such that when the ribbon is heated the magnet will assist the transfer of the pigment onto the record medium.

Figure 2:
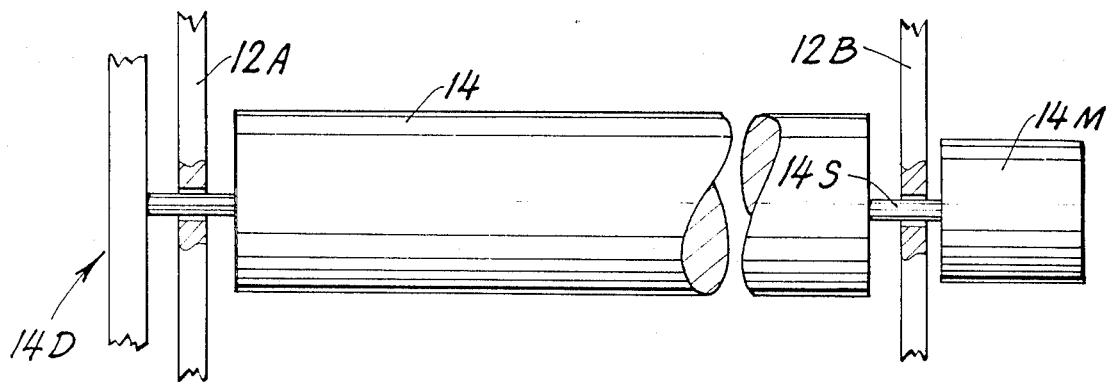
FIG. 2 is a side view of a common drive roller assembly.

In FIG. 2 there is shown the common drive roller 14 journelled in end supports 12A and 12B. The shaft 14S of the roller is ridgidly connected to motor 14M to enhance reproducibility of positioning. The rotationally position in positively fixed by a detenting means connected to the other end of shaft 14S. Disposed about the surface of disk 114 near its peripheral edge are a set of equispaced pins 114P. Adjacent the pins is a lever arm 214 with a notch 214N pivotably mounted on support 12A by pin 214P. A spring 214S biases the lower arm 214 and the notch thereof toward a pin 114P. A solenoid 214M when engaged pulls the lever arm out of engagement. In operation the drive roller is rotated by motor 14M to an approximate desired position while solenoid 214M is energized. When the motor is stopped the solenoid is de-energized with V-shapd notch 214N engaging a pin to lock the roller in a known position. When a new position is desired, the solenoid is energized, and the motor rotated.

Figure 3A:
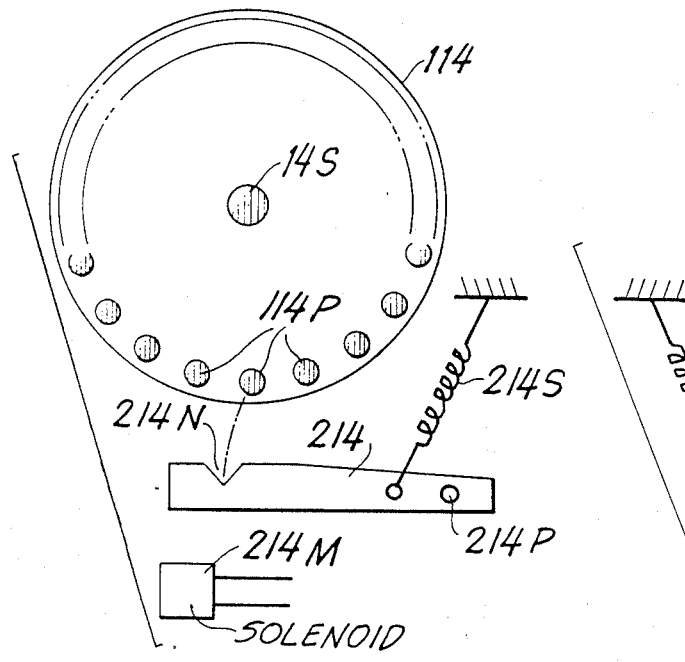
FIGS. 3a and 3b are different embodiments of an end view of the assembly of FIG. 2.
Figure 3B:
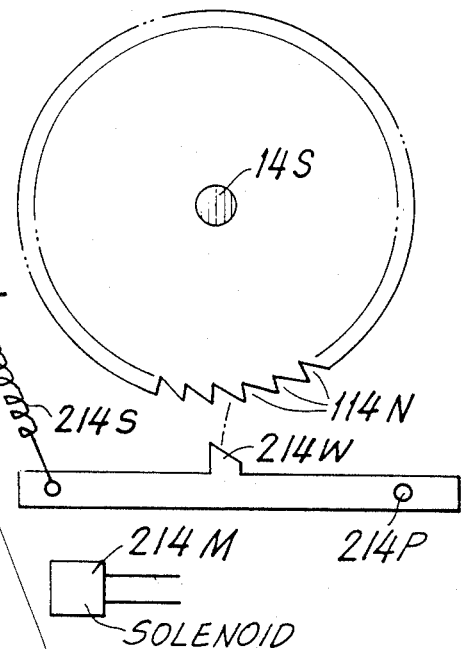

In FIG. 3B a modification of the detenting means is showing which is similar to that of FIG. 3A, the main difference is that pins 114P have been replaced by notches 114N in the peripheral edge of the disk 114 and the notched lever 214 is replaced by wedge shaped base 214W. The operation of the embodiment is the same as that of FIG. 3A.

It is also possible to do electronic detenting by utilizing a shaft encoder and servo system to control the positioning of the motor.

Although only one embodiment of the invention has been shown and described in detail, there will now be obvious to those skilled in the art, many modifications and variations satisfying many or all of the objects of the invention without departing from the spirit thereof.

What is claimed is:

1. A reader-writer apparatus comprising: a common drive roller having a primary axis of rotation lying in a region dividing plane; a read follower roller means operatively opposite said common drive roller, having an axis parallel to said primary axis of rotation and disposed on a read side of said region dividing plane; a write follower roller means operatively opposite said common drive roller, having an axis parallel to said primary axis of rotation and disposed on a write side of said region dividing plane; master document input means disposed on said read side of said region dividing plane for guiding a master document between said common drive roller and said read follower roller means to a read site; a master document accepting means disposed on said read side of said region dividing means for accepting a master document passing from said read site; said master document input means, said read site, and said master document accepting means defining a master document travel path; a copy medium input means disposed on said write side of said region dividing plane for guiding a copy medium between said common drive roller and said write follower means to a write site; a copy medium accepting means disposed on said write side of said region dividing means for accepting a copy medium passing from said write site; said copy medium guiding means, said write site, and said copy medium accepting means defining a copy medium travel path; a master document scanning means on said read side of said region dividing plane, as said read site and operatively disposed with respect to said master document travel path for scanning information from a master document moving along said master document travel path; and a copy medium recording means on said write side of said region dividing plane at said write site and operatively disposed with respect to said copy medium travel path for recording information on a copy medium moving along said copy medium travel path.

2. The reader-writer apparatus of claim 1 wherein: said master document scanning means comprises a scanning bed positioned with respect to said master document travel path such that a master document moving along said master document travel path moves over said scanning bed while said scanning bed lies between said master document travel path and said region dividing plane, and a scanning transducer element operatively opposite said scanning bed and positioned to scan the surface of a master document which faces away from said region dividing plane; and said copy medium recording means comprises a platen positioned with respect to said copy medium travel path such that a copy medium moving along said copy medium travel path moves over said platen while said platen lies between said copy medium travel path and said region dividing plane, and printing transducer element operatively opposite said platen and positioned to print on the surface of a copy medium which faces away from said mode dividing plane.

3. The reader-writer apparatus of claim 2 wherein said platen is magnetically polarized.

4. The read-writer apparatus of claim 2 further comprising read tensioning means disposed along said master document travel path between said scanning bed and said master document accepting means and cooperating with said common drive roller and said read follower roller means for applying tension to the region of a master document moving over said scanning bed.

5. The read-write apparatus of claim 3 further comprising write tensioning means disposed along said copy medium travel path between said platen and said copy medium accepting means and cooperating with said common drive roller and said write follower roller means for applying tension to the region of a copy medium moving over said platen.

6. The read-write apparatus of claim 4 wherein said read tensioning means comprises a driven roller means rotating about an axis parallel to said master axis of rotation and freely rotating roller means operatively opposite thereto.

7. The read-write apparatus of claim 5 wherein said write tensioning means comprises a driven roller means rotating about an axis parallel to said master axis of rotation and freely rotating roller means operatively opposite thereto.

8. The read-write apparatus of claim 1 wherein at least one of said read follower means comprises at least one roller array, said roller array comprising a yoke element, means for supporting said yoke element to pivot along an axis parallel to said primary axis of rotation, first and second rollers on said yoke, said rollers being operatively opposite said common drive roller and mutually displaced along the circumference of said common drive roller, said rollers being freely rotatable about different axes parallel to said axis of rotation.

9. The read-write apparatus of claim 1 further comprising a motor with a drive shaft rigidly connected to said common drive roller.

10. The read-write apparatus of claim 1 further comprising mechanical detenting means for controllably locking said common drive roller into fixed predetermined rotational positions.

11. The read-write apparatus of claim 2 further comprising one transducer element moving means for moving one of said transducer elements along a line parallel to said primary axis of rotation.

12. The read-write apparatus of claim 11 wherein said one transducer element moving means comprises a carrier upon which said transducer element is supported, a pair of mutually displaced rails disposed in lines parallel to said primary axis of rotation upon which said carrier is freely slidable, a driven lead screw parallel to said rails and a nut member on said carrier which meshes with said driven lead screw.

13. The read-write apparatus of claim 11 further comprising another transducer element moving means for moving the other of said transducer elements along a line parallel to said primary axis of rotation, said other transducer element moving means comprising a carrier upon which said transducer element is supported, a pair of mutually displaced rails disposed in lines parallel to said primary axis of rotation upon which said carrier is freely slidable, a driver lead screw parallel to said rails and a nut member on said carrier which meshes with said driven lead screw.

14. The read-write apparatus of claim 1 wherein said master document input means is vertically above said copy medium accepting means on one side of a vertical plane passing through said primary axis of rotation whereby the bottom of said master document input means acts as deflector for deflecting copy medium into said copy medium accepting means.

15. The read-write apparatus of claim 14 wherein said master document accepting means is vertically above said copy meidum input means on the other side of said vertical plane.

16. The read-write apparatus of claim 15 wherein said copy medium input means comprising an envelope tray means, a first-sheet tray means and a second-sheet tray means, said tray means being vertically displaced from each other, and guiding means for guiding output from each tray means to the region between said common drive roller and said write follower roller means.

17. The read-write apparatus of claim 16 wherein each of said sheet tray means includes a container for copy medium, a controllably rotatable drive roller and biasing means for biasing copy medium to press against said controllably rotatable drive roller.

18. The read-write apparatus of claim 17 wherein the controllably rotatable drive roller associated with one of said sheet tray means is above said tray means and the biasing means associated therewith is a spring means in the bottom of the container associated therewith.

19. The read-write apparatus of claim 18 wherein said envelope tray means includes a shelf upon which envelopes are stacked and a wall providing a front stop for the envelopes said shelf being displaced from said wall to provide a feed gap, a rotatably driven feed roller associated therewith being in said feed gap for supporting envelopes and a removable weight member for resting on the portions of the envelopes above the feed gap.

20. The read-write apparatus of claim 19 wherein said envelope tray means includes a shelf upon which envelopes are stacked and a wall providing a front stop for the envelopes said shelf being displaced from said wall to provide a feed gap, a rotatably driven feed roller associated therewith being in said feed gap for supporting envelopes and a removable weight member for resting on the portions of the envelopes above the feed gap.

* * * * *